(12) United States Patent
Matsubara et al.

(10) Patent No.: US 7,442,356 B2
(45) Date of Patent: Oct. 28, 2008

(54) PROCESS FOR PRODUCING INORGANIC SPHERES

(75) Inventors: Toshiya Matsubara, Ichihara (JP);
Masaharu Tanaka, Kitakyushu (JP);
Hajime Katayama, Ichihara (JP); Kenji Yamada, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 340 days.

(21) Appl. No.: 11/271,905

(22) Filed: Nov. 14, 2005

(65) Prior Publication Data

US 2006/0067864 A1    Mar. 30, 2006

Related U.S. Application Data

(63) Continuation of application No. PCT/JP2004/006810, filed on May 13, 2004.

(30) Foreign Application Priority Data

May 13, 2003   (JP) .................... 2003-133992

(51) Int. Cl.
| | |
|---|---|
| C01B 33/32 | (2006.01) |
| C01B 33/12 | (2006.01) |
| C01F 1/00 | (2006.01) |
| C01F 3/00 | (2006.01) |
| C01F 7/00 | (2006.01) |
| C01G 15/00 | (2006.01) |
| C22B 21/00 | (2006.01) |
| C22B 35/00 | (2006.01) |
| C22B 58/00 | (2006.01) |
| C22B 61/00 | (2006.01) |
| B01F 3/04 | (2006.01) |
| B01F 17/00 | (2006.01) |
| C09K 3/00 | (2006.01) |

(52) U.S. Cl. .................. 423/332; 423/333; 423/338; 423/339; 423/122; 516/21; 516/22

(58) Field of Classification Search ................. 423/338, 423/339, 122, 332, 333; 502/12, 9; 264/41; 252/315.7; 516/21, 22
See application file for complete search history.

(56) References Cited

U.S. PATENT DOCUMENTS 5,278,106 A    1/1994    Nakashima et al.

(Continued)

FOREIGN PATENT DOCUMENTS

EP    0 528 201 A2    2/1993

(Continued)

OTHER PUBLICATIONS

Joscelyne, Simon M. et al. "Membrane Emulsification—A Literature Review", 2000, Journal of Membrane Science, 169 (2000), pp. 107-117.*

(Continued)

Primary Examiner—Stuart Hendrickson
Assistant Examiner—Anthony J Zimmer
(74) Attorney, Agent, or Firm—Oblon, Spivak, McClelland, Maier & Neustadt, P.C.

(57) ABSTRACT

To provide a process for producing inorganic spheres having a substantially uniform particle size with high productivity. In a process for producing inorganic spheres, which comprises a step of injecting an alkaline aqueous liquid containing an inorganic compound into a laminar flow of an organic liquid containing a surfactant through micropores to form a W/O type emulsion, and a step of solidifying droplets of the aqueous liquid containing an inorganic compound in the W/O type emulsion by an acid to form inorganic spheres, as the organic liquid, one which is brought into contact with an acid in a state of the W/O type emulsion or after separated from the W/O type emulsion, or one which is brought into contact with the aqueous liquid and then separated and recovered, is used.

19 Claims, 2 Drawing Sheets

U.S. PATENT DOCUMENTS

| | | | |
|---|---|---|---|
| 5,376,347 A * | 12/1994 | Ipponmatsu et al. | 423/338 |
| 6,576,023 B2 | 6/2003 | Nakajima et al. | |
| 7,022,300 B2 * | 4/2006 | Matsubara et al. | 423/338 |
| 2004/0251569 A1 * | 12/2004 | Matsubara et al. | 264/5 |
| 2004/0258601 A1 | 12/2004 | Matsubara et al. | |

FOREIGN PATENT DOCUMENTS

| | | |
|---|---|---|
| EP | 1 382 384 A1 | 1/2004 |
| GB | 2279944 | 1/1995 |
| GB | 2285255 | 7/1995 |
| JP | 59-112830 | 6/1984 |
| JP | 4-154605 | 5/1992 |
| JP | 7-75728 | 3/1995 |
| JP | 7069617 | 3/1995 |
| JP | 7232911 | 9/1995 |
| JP | 2002-119841 | 4/2002 |

OTHER PUBLICATIONS

Schroder, Volker et al. "Effect of Dynamic Interfacial Tension on the Emulsification Process Using Microporous, Ceramic Membranes", 1998, Journal of Colloid and Interface Science, 202 (1998), pp. 334-340.*

Rayner, Marilyn et al. "Membrane Emulsification Modelling: How Can We Get From Characterization to Design?", 2002, Desalination, 145 (2002), pp. 165-172.*

Katoh, Ryoh et al. "Preparation of Food Emulsions Using a Membrane Emulsification System", 1996, Journal of Membrane Science 113 (1996) pp. 131-135.*

Iizuka et al. JP59-112830 Abstract. Patent Abstracts of Japan. Jun. 29, 1984.*

U.S. Appl. No. 11/271,905, filed Nov. 14, 2005, Matsubara, et al.

* cited by examiner

PROCESS FOR PRODUCING INORGANIC SPHERES

TECHNICAL FIELD

The present invention relates to a process for producing inorganic spheres. Particularly, it relates to a process for producing inorganic spheres having a substantially uniform particle size useful for chromatography supports, cosmetic applications, catalyst supports, etc., with high productivity by a stable continuous process.

BACKGROUND ART

Heretofore, various methods have been proposed to obtain inorganic spheres having a uniform particle size. U.S. Pat. No. 5,278,106 discloses a method for producing inorganic spheres which comprises injecting an aqueous liquid into an organic solvent through a microporous membrane to prepare a W/O type emulsion and converting droplets in the resulting W/O type emulsion into inorganic spheres.

The particle size distribution of the emulsion can be narrowed by this method, but this method is insufficient in terms of uniformity in the particle size of the inorganic spheres, since the flow of the organic solvent is not controlled, which causes an emulsion particle size distribution. Further, because a glass microporous membrane with poor alkali resistance has problems with its durability such as erosion of the pores to larger size by an aqueous solution containing an alkali metal silicate as the aqueous liquid, a W/O type emulsion having a uniform particle size can not be obtained continuously and stably.

In recent years, U.S. Pat. No. 6,576,023 proposed a method and an apparatus for producing a homogenous emulsion by injecting a pressurized aqueous solution containing an inorganic compound through distorted micropores into an organic liquid. Recently, development of a method and an apparatus which allow long-term efficient and stable mass production of inorganic spheres having a uniform particle size has been desired.

DISCLOSURE OF THE INVENTION

The object of the present invention is to provide a process for producing inorganic spheres having a highly uniform particle size stably with high productivity, suitable for mass production.

The present invention provides a process for producing inorganic spheres, which comprises a step of injecting an alkaline aqueous liquid containing an inorganic compound into a laminar flow of an organic liquid containing a surfactant and running at a flow rate of from 0.001 to 2 m/s in a flow path compartmentalized by diaphragms through micropores penetrating through one diaphragm in its thickness direction to form a W/O type emulsion, a step of solidifying droplets of the aqueous liquid containing an inorganic compound in the W/O type emulsion by an acid to form inorganic spheres, and a step of recycling the organic liquid separated and recovered from the W/o emulsion or a liquid after formation of the inorganic spheres, to the flow path for the organic liquid, wherein the organic liquid recycled to the flow path for the organic liquid is one which has been brought into contact with an acid in a state of the W/O emulsion or after separated from the W/O emulsion.

Further, the present invention provides a process for producing inorganic spheres, which comprises a step of injecting an alkaline aqueous liquid containing an inorganic compound into a laminar flow of an organic liquid containing a surfactant and running at a flow rate of from 0.001 to 2 m/s in a flow path compartmentalized by diaphragms through micropores penetrating through one diaphragm in its thickness direction to form a W/O type emulsion, and a step of solidifying droplets of the aqueous liquid containing an inorganic compound in the W/O type emulsion by an acid to form inorganic spheres, wherein the organic liquid supplied to the flow path for the organic liquid is one which has been brought into contact with the alkaline aqueous liquid and then separated and recovered.

Figure 1:
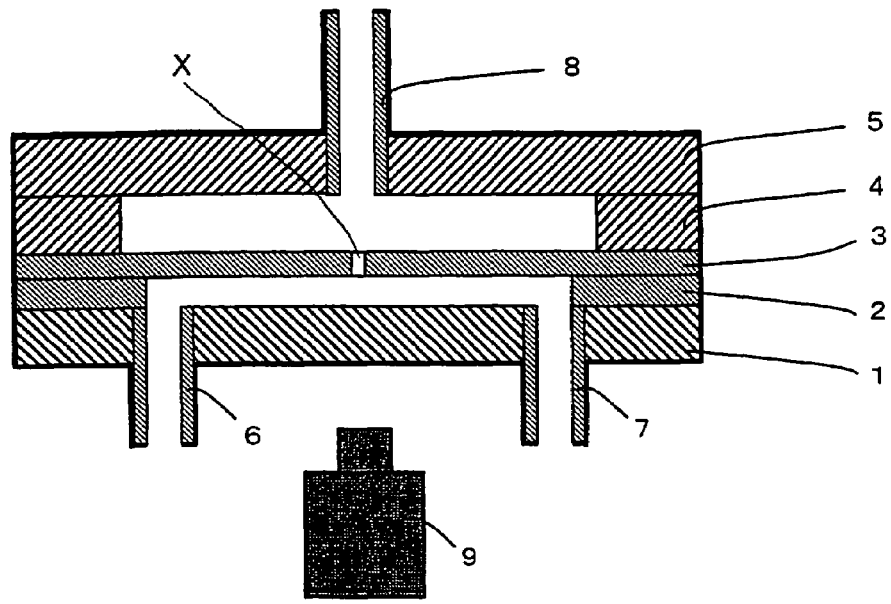
FIG. 1 is a cross-sectional view illustrating an emulsification apparatus used in Examples 1 and 2.

EXPLANATION OF SYMBOLS 1, 5, 10, 13: Acrylic resin plate
2, 11: Fluororesin sheet
3, 12: Stainless steel plate
4: Acrylic resin plate member
6, 7: Nozzle formed on the acrylic resin plate 1
8: Nozzle formed on the acrylic resin plate 5
9: High speed camera
14, 15: Nozzle formed on the acrylic resin plate 10
16, 17: Nozzle formed on the acrylic resin plate 13
X: Micropores penetrating through the stainless steel plate 3
Y: Micropores penetrating through the stainless steel plate 12

BEST MODE FOR CARRYING OUT THE INVENTION

In the process for producing inorganic spheres of the present invention, an alkaline aqueous liquid containing an inorganic compound is injected through micropores into a laminar flow of an organic liquid containing a surfactant to form an emulsion containing the organic liquid as a dispersion medium (continuous phase) and droplets of the aqueous solution containing an inorganic compound as a dispersed phase in the continuous phase, i.e. a W/O type emulsion, and then the droplets of the aqueous liquid containing an inorganic compound in the W/O type emulsion are solidified to form inorganic spheres.

As the alkaline aqueous liquid containing an inorganic compound, any liquid may be used so long as it forms a precipitate upon solidification. Not only an aqueous solution of an inorganic compound but also a colloidal solution such as a silica sol may be employed. As the aqueous solution of an inorganic compound, specifically, an aqueous solution of an alkali metal silicate or aluminate may be mentioned.

In the present invention, use of an aqueous liquid containing as an inorganic compound at least one member selected from the group consisting of potassium silicate, sodium silicate, sodium aluminate and silica is preferred. Specifically, an aqueous solution containing a water-soluble silica, an aqueous dispersion containing a solid silica (colloidal silica) such as a silica sol obtained by hydrolysis of an organic silicon compound or a commercially available silica sol, and an aqueous solution of potassium silicate or sodium silicate are preferably used. An aqueous solution of sodium silicate is most preferred for availability and economical reasons. The proportion of silicic acid to sodium is preferably from 2.0 to 3.8, more preferably from 2.0 to 3.5, in terms of $SiO_2/Na_2O$ molar ratio. The concentration of the alkali silicate or silica in the aqueous liquid is preferably from 5 to 30 mass %, particularly preferably from 5 to 25 mass %, in terms of the $SiO_2$ concentration.

As the organic liquid, an organic solvent having a surfactant dissolved therein is used. As the organic solvent, a $C_{9-12}$ saturated hydrocarbon is preferred, and selection of the organic liquid includes total consideration of ease of handling, fire safety, ease of separation between the solidified particles and the organic liquid, geometrical qualities of the inorganic spherical particles, solubility of the organic liquid in water, etc. The $C_{9-12}$ saturated hydrocarbon may be used alone or as a mixture of at least two. The $C_{9-12}$ saturated hydrocarbon may be a linear hydrocarbon or a hydrocarbon having side chains so long as its chemical stability is good.

As the $C_{9-12}$ saturated hydrocarbon, preferred is one having a flash point of from 20 to 80° C. If a saturated hydrocarbon having a flash point below 20° C. is employed as the organic solvent, the excessively low flash point necessitates countermeasures for fire prevention and work environment protection. On the other hand, a hydrocarbon having a flash point exceeding 80° C. is hardly volatile and may adhere to the resulting inorganic spheres in a large amount.

In the present invention, the W/O type emulsion and the organic liquid are usually subjected to liquid-liquid separation, and the inorganic spheres and the organic liquid after solidification of the emulsion are usually subjected to solid-liquid separation. The organic liquid adhering to or adsorbed in the W/O type emulsion or the inorganic spheres after separation is preferably vaporized off by e.g. a drying operation. The organic liquid preferably has a boiling point of at most 200° C. so that the organic liquid easily vaporizes off, and as the organic liquid which satisfies such requirements, preferred is at least one member selected from the group consisting of $C_9H_{20}$, $C_{10}H_{22}$ and $C_{11}H_{24}$.

As the surfactant, although an anionic surfactant or a cationic surfactant may be employed, a nonionic surfactant is preferred because adjustment of the balance between hydrophilicity and lipophilicity is easy. For example, a polyethylene glycol fatty acid ester, a polyethylene glycol alkyl ether, a sorbitan fatty acid ester, a polyoxyethylene sorbitan fatty acid ester, a polyoxyethylene alkyl phenyl ether and a polyoxyethylene alkyl ether are preferred.

The amount of the surfactant varies depending upon conditions such as the type of the surfactant, HLB (hydrophile-lipophile balance) as an index of the degree of hydrophilicity or hydrophobicity of the surfactant and the aimed particle size of the inorganic spheres. However, it is preferably contained in an amount of from 500 to 50,000 ppm, preferably from 1,000 to 20,000 ppm, in the organic liquid. If it is less than 500 ppm, an unstable emulsion which contains large droplets of the aqueous solution may be obtained upon emulsification. On the other hand, if it exceeds 50,000 ppm, the amount of the surfactant adhering to the inorganic spherical particles as the product unfavorably tends to be large.

In the present invention, by adjusting the flow rate of the organic liquid to from 0.001 to 2 m/s, emulsion droplets having a narrow particle size distribution are formed, and therefore, the particle size distribution of the obtained inorganic spheres can be narrowed. The flow rate of the organic liquid is more preferably from 0.01 to 1 m/s.

The Reynolds number of the flow of the organic liquid in the flow path is adjusted to at most 2,100. When the flow path has a circular cross section, the Reynolds number is calculated from the formula 1, and as the inner diameter D of the flow path, the minimum diameter of the cross section of the flow path is employed. D is the inner diameter (m) of the flow path, u is the average flow rate (m/s), ρ is the fluid density (kg/m³), and μ is the fluid viscosity (Pa·s).

$$\text{Reynolds number }(-)=D \cdot u \cdot \rho/\mu \quad \text{Formula 1}$$

When the cross section of the flow path is not circular, the Reynolds number is calculated from the formula 2. r is the hydraulic radius (m) of the flow path={cross-sectional area (m²) of the flow path}/{perimeter (m) of the cross section of the flow path which is in contact with the fluid}, and u, ρ and μ are as defined for the formula 1.

$$\text{Reynolds number }(-)=4 \times r \cdot u \cdot \rho/\mu \quad \text{Formula 2}$$

If the Reynolds number is at most 2,100, the flow of the organic liquid is laminar and therefore stable. As a result, the aqueous liquid containing an inorganic compound supplied through the micropores constantly forms a W/O type emulsion having a fixed particle size, and therefore, inorganic spheres having a substantially uniform particle size are likely to be produced. On the other hand, if the Reynolds number exceeds 2,100, the flow of the organic liquid is turbulent. Therefore, the resulting W/O type emulsion tends to have uneven particle sizes, like conventional ones, and the resulting inorganic spheres also have uneven particle sizes. The shape of the flow path for the organic liquid is not particularly limited. In order to stabilize the flow of the organic liquid, the Reynolds number of the flow of the organic liquid is preferably at most 500. The shape of the flow path for the organic liquid is not particularly limited.

In the present invention, the organic liquid separated and recovered from the W/O type emulsion or a liquid after formation of the inorganic spheres is recycled to the flow path for the organic liquid and recycled for the emulsification step. In order to stably produce the W/O type emulsion over a long period, it is required that surfactant ability is stable, and according to the studies by the present inventors, it was found that the surfactant ability gradually decreases by the contact with an alkali. The present inventors have found that the decrease in the surfactant ability can be suppressed by bringing the W/O type emulsion or the organic liquid separated and recovered from the liquid after formation of the inorganic spheres, in a state of the W/O type emulsion or after separated from the W/O type emulsion, into contact with an acid. Accordingly, a W/o type emulsion having a highly uniformalized particle size and inorganic spheres can be produced stably with high productivity over a long period by a stable continuous process.

Further, as a result of various studies, the present inventors have found that the surfactant ability initially decreases after contact with an alkali in some cases depending upon the type of the surfactant, but by use of an organic liquid which has been preliminarily brought into contact with an alkali and then separated and recovered to the emulsification step, influences of such an initial decrease of the surfactant ability can be avoided.

Figure 4:
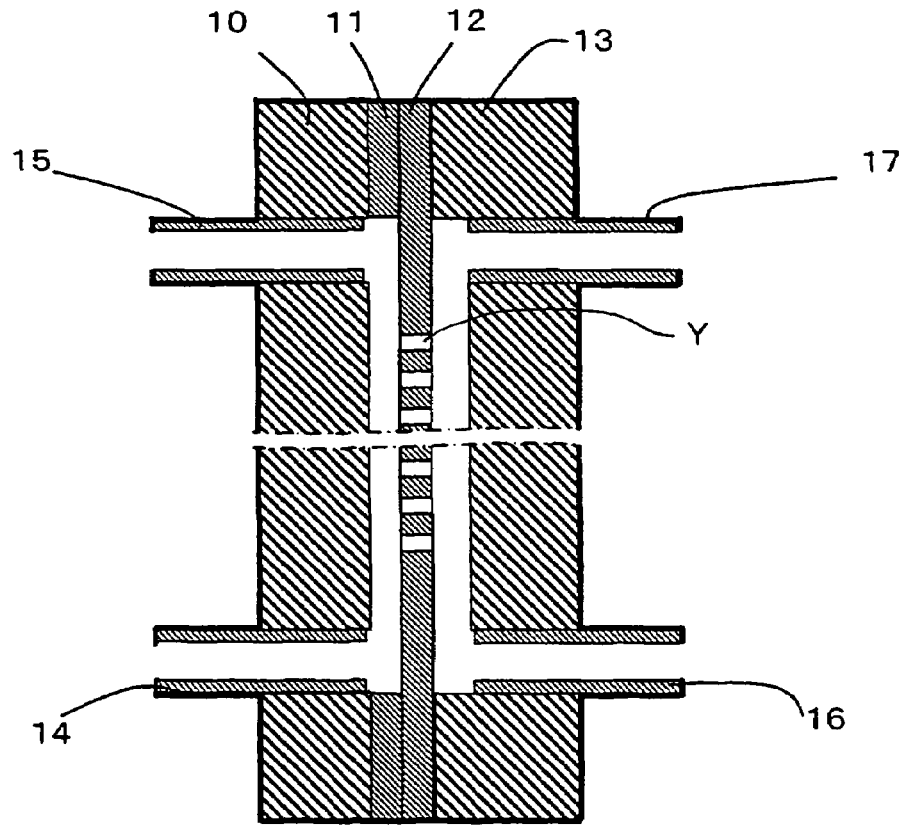
FIG. 4 is a cross-sectional view illustrating an emulsification apparatus used in Examples 3 to 11.

Now, the embodiment of the present invention will be explained with reference to the drawings. In FIG. 1, numerical references 1 and 5 designate acrylic resin plates, 2 a fluororesin sheet, 3 a stainless steel plate and 4 an acrylic resin plate member. In FIG. 1, the aqueous liquid containing an inorganic compound is introduced from a nozzle 8 and injected through micropores X penetrating through the stainless steel plate 3 into a laminar flow of an organic liquid which is introduced from a nozzle 6 and discharged from a nozzle 7. Further, in FIG. 4, numerical references 10 and 13 designate acrylic resin plates, 11 a fluororesin sheet and 12 a stainless steel plate. In FIG. 4, while an aqueous liquid containing an inorganic compound runs so that it is introduced from a nozzle 16 and discharged from a nozzle 17, it is injected through micropores Y penetrating through the stainless steel plate 12 into a laminar flow of an organic liquid which is introduced from a nozzle 14 and discharged from a nozzle 15.

The aqueous liquid injected through the micropores X or Y grows larger than the pore size of the micropores X or Y at their outlet due to surface tension. Then, droplets are cut off by the flow of the organic liquid and become droplets of a W/O type emulsion in the organic liquid.

In the present invention, it is preferred that the organic liquid separated and recovered from the liquid obtained after the step of forming the W/O type emulsion is brought into contact with an acid and then recycled to the flow path for the organic liquid and recycled for the emulsification step. Specifically, as shown in chart of FIG. 2, a method may be mentioned wherein the W/O type emulsion discharged from the emulsification step is introduced into a separation apparatus and separated into an organic liquid (A) and a W/O type emulsion (B) in which the aqueous liquid is concentrated, (A) is brought into contact with an acid and then recycled to the flow path for the organic liquid and recycled for the emulsification step, and at the same time, droplets of the aqueous liquid containing an inorganic compound in (B) are introduced for a solidification apparatus and solidified.

Figure 2:
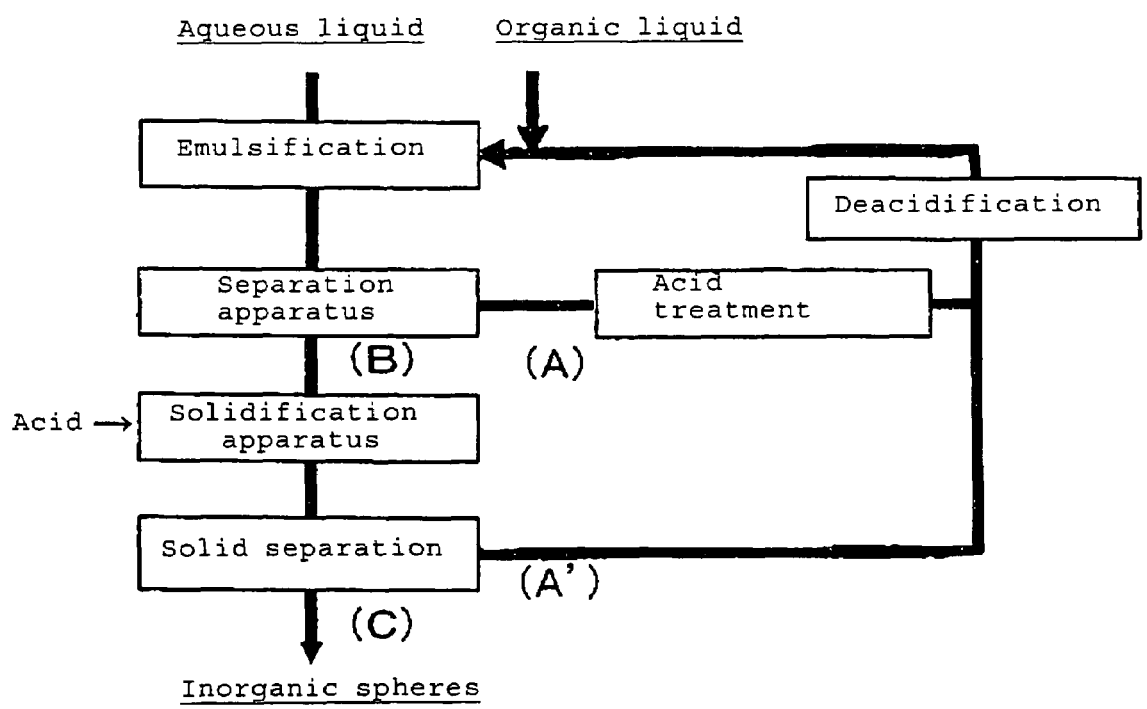
FIG. 2 is a diagram schematically illustrating production of the inorganic spheres of the present invention.
Figure 3:
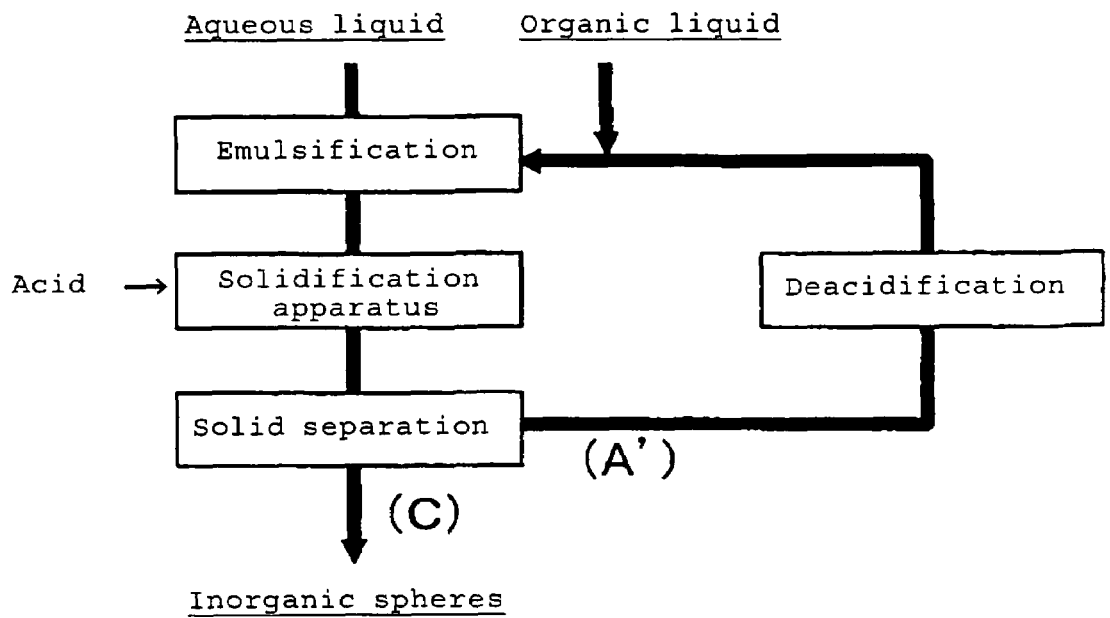
FIG. 3 is a diagram schematically illustrating production of the inorganic spheres of the present invention.

Further, as shown in FIGS. 2 and 3, a method may also be preferably employed wherein the W/O type emulsion discharged from the emulsification step is introduced into a solidification apparatus, droplets of the aqueous liquid containing an inorganic compound in the W/O type emulsion are solidified by an acid, and the obtained solid is separated into an organic liquid (A') and inorganic spheres (C), and (A') is subjected to deacidification treatment and then recycled for the emulsification step. In such a case, by use of an acid as a solidifying agent, acid treatment of (A') may be carried out simultaneously with the solidification, whereby inorganic spheres can be produced stably for a long term.

Further, as shown in FIG. 2, it is more preferred to carry out separation into (A') and (C) after separation into (A) and (B), whereby the solvent recovery rate will be more improved. The operation of recycling (A) or (A') to the flow path for the organic liquid and recycling it for the emulsification step is included in the operation of supplying the organic liquid separated and recovered from the liquid after the alkaline aqueous liquid and the organic liquid are brought into contact with each other, to the flow path for the organic liquid and recycling it for the emulsification step. When the organic liquid is recycled for the emulsification step, as shown in FIGS. 2 and 3, it is preferred to add an organic liquid in an amount corresponding to the amount of loss in e.g. the separation step, and the organic liquid added in such a case is also preliminarily brought into contact with an alkali. However, in a case where the ratio of volume of the reduced organic liquid is 30% or less relative to the organic liquid introduced from the nozzle 6 or 14, the organic liquid which is not preliminarily brought into contact with an alkali may be added.

The type of the separation apparatus used for the above separation operation is not particularly limited, but preferred is one which separates liquids employing a difference in specific gravity between an aqueous liquid phase and an organic liquid phase, in view of operation efficiency and the like. The separation into (A) and (B) is carried out by making the emulsion stay in the separation apparatus for from 1 minute to 12 hours. If the retention time is shorter than 1 minute, separation will be insufficient, and part of the aqueous liquid phase may accompany the organic liquid phase, which leads to a decrease in the yield and dispersion of quality. Further, if the retention time exceeds 12 hours, the droplets may be united to form large particles which deviate from a desired droplet size, and expansion of the apparatus may increase the installation cost. The retention time is more preferably from 3 minutes to 8 hours.

On the other hand, the separation into (A') and (C) is carried out preferably by making the mixture stay in the separation apparatus for from 1 minute to 5 hours. If the retention time is less than 1 minute, separation may be insufficient, and part of the inorganic spheres may accompany the organic liquid phase, which leads to a decrease in the yield and dispersion of quality. Further, if the retention time exceeds 5 hours, precipitates tend to be deposited on the bottom of a tank and are less likely to be discharged and in addition, expansion of the apparatus may increase the installation cost. The retention time is more preferably from 2 minutes to 3 hours.

When the organic liquid recovered by the above separation operation is recycled, if there is possibility of an increase in the temperature of the organic liquid e.g. by heat input by a pump, the organic liquid is recycled preferably by being cooled through a cooler for the purpose of preventing loss due to an increase of a vapor pressure.

The acid to be in contact with the organic liquid may, for example, be an inorganic acid or an organic acid. Particularly, it is preferred to use carbon dioxide gas or a solid acidic substance with a view to easily carrying out deacidification treatment after the acid treatment of the organic liquid and before recycle for the emulsification step, and as the solid acidic substance, a cation exchange resin may, for example, be mentioned.

Further, the acid to be used for the solidification step, an inorganic acid, e.g., sulfuric acid, hydrochloric acid, nitric acid or carbon dioxide is preferred. Use of carbon dioxide gas is the simplest and the most suitable from the viewpoint of easy operations. As the carbon dioxide gas, pure carbon dioxide gas having a 100% concentration may be introduced, or carbon dioxide gas diluted with air or an inert gas may be introduced. Particularly, an organic liquid having carbon dioxide gas dissolved in a $C_{9-12}$ saturated hydrocarbon is preferred, whereby solidification can be carried out while keeping the shape of fine droplets, and the solidification rate can easily be controlled. Further, other advantages can be obtained such that excellent operation efficiency will be obtained such that separation into the inorganic spheres and the organic liquid after solidification becomes easy, and that the solidification will moderately proceed. The time required for the solidification is usually preferably from 4 to 30 minutes, and the temperature at the solidification is preferably from 5 to 30° C.

In the apparatus for producing inorganic spheres of the present invention, as a material constituting a diaphragm, one having resistance against the aqueous liquid containing an inorganic compound and against the organic liquid is used. One composed mainly of a metal is preferred in view of excellent processability and strength, and in addition, one composed mainly of a resin is also suitably used. As a resin, it is preferred to use at least one member selected from a polyphenylene sulfide, a polyether ether ketone, a polyimide, a polyamide, an aromatic polyester and a fluororesin, in view of excellent processability and dimensional stability.

The material constituting a diaphragm having micropores penetrating in the thickness direction preferably has affinity for the organic liquid or water repellency. This is to facilitate release of the aqueous liquid containing an inorganic compound after passing through the micropores from the diaphragm. It has been found by observation by a high speed camera that if the diaphragm is hydrophilic, the aqueous liquid after passing through the micropores tends to flow along the diaphragm and form uneven droplets in the emulsion. In a case where the diaphragm is made of a metal material, it is preferred to make it have affinity for the organic liquid by a method of baking an oil on it, or to coat the surface with a water repellent having a hydrophobic resin or a silane coupling agent dissolved in a solvent. In such a case, the hydrophobic resin is preferably a thermoplastic resin, because even if the micropores are clogged by coating, the pores can be opened by heat treatment. Further, it is preferred to use as the hydrophobic resin a solvent-soluble fluororesin in view of durability.

Further, it is preferred that at least part of the diaphragm constituting the flow path for the organic liquid is made of a transparent material, whereby the step of forming emulsion droplets can be continuously monitored from outside through the transparent material, and inorganic spheres having a substantially uniform particle size can be stably produced. The transparent material is not particularly limited so long as it has durability against the organic liquid and the aqueous liquid, and an acrylic resin, a polycarbonate or the like is preferably used.

In FIG. 1, continuous monitoring is carried out by providing a high speed camera 9 via an acrylic resin plate 1. It is preferred that while image information obtained by the high speed camera 9 is analyzed by image processing, emulsification conditions are adjusted based on results of the analysis. The adjustment may be carried out by manual or automatic control, but is carried out preferably by automatic control in view of quick adjustment of the emulsification conditions. Further, it is preferred to provide a sliding guide so that the high speed camera 9 can move from side to side and up and down, whereby dispersion of the emulsion droplet size among the micropores can be observed.

In the present invention, the micropores preferably have a circular cross section, but may have a cross section other than a circular shape. The micropores preferably have at least one cross section selected from the group consisting of a rectangular, an ellipse and a triangle, which does not form a convex shape into the inside, whereby processing will relatively easily be carried out, and inorganic spheres having a uniform particle size can be stably produced. However, it is essential that all the pores are pores smaller than the width of the flow path for the organic liquid. The method of forming the micropores may be a processing method employing a laser such as an excimer laser or pressing, but is not particularly limited.

In a case where the micropores have a cross section other than a circular shape, it is estimated that droplets which become droplets at the outlet of the pores have a curvature distribution, and are spontaneously separated off at a relatively early stage and become droplets in the organic liquid. Accordingly, there is such an advantage that droplets having a relatively small emulsion particle size tend to be easily obtained as compared with a case of using circular pores. Further, the ratio of the diameter of a circle which is circumscribed about the cross-sectional shape to the diameter of a circle which is inscribed in the cross-sectional shape is preferably at most 20, more preferably at most 10. If it exceeds 20, the droplets tend to be divided in the major axis direction and resultingly, uneven emulsion particles tend to be obtained. It is particularly preferred that the diameter of a circle which is inscribed in the cross-sectional shape is at least 1 μm and that the diameter of a circle which is circumscribed about the cross-sectional shape is at most 80 μm.

The quadruple of the hydraulic radius r of the cross section of the micropores is preferably from 0.1 to 100 μm. It is more preferably from 1 to 80 μm. r is, in the same manner as for the formula 2, the hydraulic radius (m) of the cross section={cross-sectional area (m$^2$) of micropore}/{perimeter (m) of the cross section of the micropore which is in contact with the fluid}. Accordingly, when the micropores have a circular cross section, the hydraulic radius r=(the inner diameter D of the circle)/4, and thus the quadruple of the hydraulic radius r corresponds to the inner diameter D of the circle. If the quadruple of the hydraulic radius r of the cross section of the micropores is less than 0.1 μm, the supply amount of the aqueous liquid containing an inorganic compound tends to be small, such being unfavorable in view of productivity. If it is larger than 100 μm, emulsion particles having particle sizes which deviate from the aimed particle size are likely to form.

In the present invention, it is preferred that a plurality of micropores X or Y which supply the aqueous liquid containing an inorganic compound are formed so that they penetrate through the stainless steel plate 3 or 12 on the flow path for the organic liquid in its thickness direction, in view of productivity. It is preferred that 100 or more, particularly preferably 1,000 or more micropores are formed, whereby sufficient productivity will be obtained.

Further, although the arrangement of the micropores X or Y is not particularly limited, in view of productivity and processability, preferred is a parallel arrangement wherein a plurality of micropores are formed at constant pitches in the width direction (width direction of the flow path for the organic liquid) and in the length direction (direction of the flow of the organic liquid), respectively, on the stainless steel plate 3 or 12, or a zigzag arrangement wherein among micropores arranged in parallel, two micropores adjacent to each other in the width direction and two micropores adjacent to each other in the length direction are selected, and another micropore is formed on the center of diagonals of a rectangular formed by connecting centers of these pores. The zigzag arrangement is particularly preferred in view of improvement of productivity, since the micropores can be densely arranged, whereby the open area ratio can be increased.

On this occasion, the open area ratio of the stainless steel plate 3 or 12 is preferably from 1 to 35%. If the open area ratio is 1% or low, the productivity tends to be low, and the installation cost tends to be comparatively high. On the other hand, if the open area ratio is 35% or higher, droplets of the emulsion formed by injecting the aqueous liquid through the micropores may be united and as a result, uneven droplets are likely to form. The open area ratio is more preferably from 2 to 25%.

The open area ratio when a plurality of micropores having a constant area are arranged in a constant arrangement is calculated from the formula 3. S is the cross-sectional area (m$^2$) of the micropores, $P_1$ is the pitch (m) in the width direction and $P_2$ is the pitch (m) in the length direction.

Open area ratio (%)=100×$S/(P_1 \times P_2)$  Formula 3

The open area ratio when circular micropores are formed in a parallel arrangement can be calculated from the formula 4. D is the diameter (m) of the micropores, and $P_1$ and $P_2$ are as defined for the formula 3.

Open area ratio (%)=78.5×$D^2/(P_1 \times P_2)$  Formula 4

Further, when circular micropores are formed in a zigzag arrangement, the open area ratio when the angle formed by the above-defined two diagonals is 90° (square zigzag arrangement) can be calculated from the formula 5, and the open area ratio when the angle is 60° (60° zigzag arrangement) can be calculated from the formula 6. D is as defined for the formula 4, and P is the pitch (m). P in the formula 6 represents the shorter pitch (m) between the pitches in the width direction and in the length direction.

$$\text{Open area ratio (\%)} = 157 \times D^2/P^2 \quad \text{Formula 5}$$

$$\text{Open area ratio (\%)} = 91 \times D^2/P^2 \quad \text{Formula 6}$$

The micropores X or Y are formed on the stainless steel plate 3 or 12 with a distance of at least half the diameter of a circle which is circumscribed about the cross-sectional shape of the micropores. They are formed more preferably with a distance of at least the diameter of a circle which is circumscribed about the cross-sectional shape of the micropores. If the micropores are formed only with a distance shorter than a half of the diameter of the circumscribed circle, droplets of the emulsion are likely to be united and as a result, uneven droplets may form. However, the micropores are formed preferably as closely as possible within a range where the droplets will not be united, so as to improve productivity.

Further, with a view to efficiently obtaining inorganic spheres having an aimed particle size, in the present invention, the ratio of the average particle size of the inorganic spheres to the quadruple of the hydraulic radius r of the cross section of the micropores is preferably from 0.1 to 5.0, more preferably from 0.3 to 3.0. If this ratio is less than 0.1, the productivity tends to be low, and it is highly possible that the average particle size of the obtained inorganic spheres is larger than the aimed value. On the other hand, if it exceeds 5.0, the particle size is less likely to be controlled, and it is highly possible that particulate particles having particle sizes which largely deviate from the aimed particle size are formed as by-products.

The particle size of the droplets in the resulting W/O type emulsion is affected not only by the above-defined conditions of forming the micropores but also by the ratio of the linear velocity of the organic liquid to the linear velocity of the aqueous liquid in the flow direction. The linear velocity of the aqueous liquid in the flow direction is measured at the micropore portion. The linear velocity ratio is preferably from 1 to 500, more preferably from 10 to 300. It is not economically preferable that the ratio exceeds 500 because the organic liquid is likely to be overspent. It is unfavorable that the ratio is less than 1, because the flow of the organic liquid can not carry away the droplets effectively, and uneven emulsion droplets are likely to be formed.

In the present invention, when the inorganic compound in the aqueous liquid containing an inorganic compound is an alkali silicate or silica, gelation of the W/O type emulsion by an acid allows the dispersed spherical droplets of the aqueous solution to gel in the same shape and gives a spherical silica hydrogel. For gelation, it is preferred to introduce a geling agent to the emulsion.

After completion of the gelation, it is preferred to keep the reaction system still so that the emulsion separates into two phases, the organic liquid phase and the aqueous phase containing a silica hydrogel, and then isolate the silica gel. When a saturated hydrocarbon is used as the organic liquid, the phase of the organic liquid separates out as the upper layer, while the phase of the aqueous liquid containing a silica hydrogel separates out as the lower layer, and then they are separated by a known means, preferably by means of a separation apparatus as mentioned above.

If necessary, an acid such as sulfuric acid is added to the aqueous slurry of the silica hydrogel to a pH of about from 1 to about 5 to complete the gelation, and then the aqueous slurry is subjected to steam distillation at a temperature of from 60 to 150° C., preferably from 80 to 120° C. to evaporate any slight amount of the saturated hydrocarbon remaining in the aqueous slurry. Further, the aqueous slurry is heated at an appropriate pH of from about 7 to about 9 to age the silica hydrogel.

After the aging as the cases requires, the aqueous slurry is filtered to recover the silica hydrogel, and the silica hydrogel is dried at a temperature of from about 100 to about 150° C. for from about 1 to about 30 hours to give porous silica spherical particles.

When an alkali silicate aqueous solution is used as the aqueous liquid, it is preferred to adequately wash the silica hydrogel recovered by filtration (wet cake) with water in order to prevent an alkali metal salt (e.g., sodium carbonate when the geling agent is carbon dioxide) formed as a by-product by gelation from contaminating the porous silica spheres. If necessary, water may be added to the washed wet cake to make a slurry again, and filtration and washing with water are repeated again. In this case, pH adjustment of the slurry to from about 1 to about 5 and aging of the silica hydrogel may be carried out again, if necessary.

EXAMPLE 1

(1) Preparation of Solutions

A sodium silicate aqueous solution having a $SiO_2$ concentration of 24.4 mass % and a $Na_2O$ concentration of 8.14 mass % ($SiO_2/Na_2O$ molar ratio=3.09, density: 1,320 kg/m$^3$) was prepared. As the organic solvent, isononane ($C_9H_{20}$, density: 730 kg/m$^3$) was employed, and sorbitan monooleate as a surfactant was preliminarily dissolved in an amount of 5,000 ppm in isononane.

(2) Assembly of Emulsification Apparatus

A cross-sectional view of an emulsification apparatus is shown in FIG. 1. On a 50 mm-square acrylic resin plate 1 having a thickness of 2 mm, two pores having an inner diameter of 3.2 mm were formed, and rubber tube pipes (TYGON tube R-3603, manufactured by Norton) having an outer diameter of 3.2 mm were connected to the two pores to make nozzles 6 and 7 so that a liquid could be supplied through the nozzle 6, and the liquid could be discharged through the nozzle 7. At the center of another 50 mm-square acrylic resin plate 5 having a thickness of 2 mm, a pore having an inner diameter of 3 mm was opened, and a tetrafluoroethylene tube pipe having an inner diameter of 1 mm was connected via a joint member to make a nozzle 8 so that a liquid could be supplied through the nozzle 8. A 30 mm square was hollowed out at the center of another 50 mm-square acrylic resin plate having a thickness of 2 mm with a margin of 10 mm from the periphery left to prepare an acrylic resin plate member 4. Further, a slit with a width of 3 mm and a length of 35 mm was formed on a 50 mm-square fluororesin sheet having a thickness of 400 μm to prepare a fluororesin sheet 2. Then, at a center portion of a 50 mm-square stainless steel plate 3 having a thickness of 50 μm, 28 pores with a pitch of 100 μm in the width direction and 230 pores with a pitch of 100 μm in the length direction in a parallel arrangement, totally 6,440 pores, each pore having an inner diameter 4r=30 μm and a circular cross-sectional shape, were opened to prepare micropores X by an excimer laser. The open area ratio of the stainless steel plate 3 was 7.1% in a range surrounded by lines connecting centers of the outermost pores in the width direction and in the length direction.

The acrylic resin plate 1, the fluororesin sheet 2, the stainless steel plate 3, the acrylic resin plate member 4 and the acrylic resin plate 5 were laminated in this order, and four sides were clamped with equal forces. On this occasion, the width direction and the length direction of the pores opened on the stainless steel plate 3 were fitted to the width direction and the length direction of the slit formed on the fluororesin sheet 2, respectively, so that the pores were located at the center portion of the slit and the pore of the nozzle 6 and the pore of the nozzle 7 of the acrylic resin plate 1 were located on the slit of the fluororesin sheet 2. Further, the assembled apparatus was checked for leaks by preliminarily supplying water.

A high speed camera 9 was disposed in front of the acrylic resin plate 1 to continuously monitor the shape and the particle size of emulsion droplets to be formed employing illumination.

(3) Emulsification

The emulsification apparatus assembled in (2) was horizontally placed, and the isononane having a surfactant dissolved therein prepared in (1) was supplied from the nozzle 6, while the sodium silicate aqueous solution prepared in (1) was supplied from the nozzle 8 to continuously produce a W/O type emulsion in which the sodium silicate aqueous solution was dispersed in the isononane having a surfactant dissolved therein. The isononane having a surfactant dissolved therein was supplied at a rate of 1,350 mL/h. The experiment was carried out at room temperature for 2 hours.

The Reynolds number of the flow of the isononane was about 213 as calculated from a hydraulic radius of the flow path of 176.5 μm, a linear velocity of 0.31 m/s and a viscosity of $7.5 \times 10^{-4}$ Pa·s, and the flow of the isononane was laminar. The supply of the sodium silicate aqueous solution was 32.2 mL/h, and the linear velocity in the flow direction at the pores was $2.0 \times 10^{-3}$ m/s.

The ratio of the linear velocity of the isononane in the flow direction to the linear velocity of the sodium silicate aqueous solution supplied through the pores in the flow direction at the pore portion was 159. The state of emulsification was confirmed by the high speed camera, whereupon the sodium silicate aqueous solution was formed into droplets at the outlet of the pores, and the emulsion particles had a substantially uniform particle size of about 60 μm.

(4) Phase Separation

The W/O type emulsion taken out from the emulsification apparatus was separated into an isononane phase and an emulsion phase utilizing a difference in specific gravity in a separation tank (diameter: 120 mm, height: 300 mm) having an effective volume of about 3 L. The retention time in the separation tank was 2.2 hours. The isononane phase after separation was supplied to the nozzle 6 and recycled for the emulsification operation.

(5) Gelation

While the emulsion phase separated in (4) was continuously supplied to a container (diameter: 100 mm, height: 650 mm) having a volume of about 5 L, carbon dioxide gas was blown into it at a supply rate of 300 mL/min for preliminary gelation to obtain an aqueous silica hydrogel slurry. The aqueous silica hydrogel slurry was adjusted to pH 9 at 25° C. with a 0.1 N aqueous sulfuric acid solution and aged at 80° C. for 1 hour. Then, it was allowed to cool to room temperature, adjusted to pH 2 with a 20 mass % aqueous sulfuric acid solution, allowed to stand still for 3 hours and filtered. The filter cake was washed with water and dried at 120° C. for 20 hours to give porous silica spheres. The yield of the obtained porous silica spheres was 19.7 g.

(6) Geometrical Analysis

It was confirmed by scanning electron microphotography that the obtained porous silica spheres were almost completely spherical. The particle size distribution was calculated by actually measuring the particle sizes of a total of more than 1,000 spheres in several photographs. The arithmetical mean particle size was 50 μm with a standard deviation of 6.4 μm. The value obtained by dividing the standard deviation in the particle size distribution by the arithmetical mean particle size was 0.128, which indicates that the porous silica spheres had a substantially uniform particle size.

EXAMPLE 2

A W/O type emulsion was continuously produced in the same manner as in Example 1. Isononane having a surfactant dissolved therein was put in a container (diameter: 100 mm, height: 650 mm) having a volume of about 5 L, and while carbon dioxide gas was blown into the solution at a supply rate of 300 mL/min, the above-obtained W/O type emulsion was continuously supplied to the container for gelation. The formed silica hydrogel was separated into an isononane phase and an aqueous liquid phase utilizing a difference in specific gravity in a separation tank (diameter: 110 mm, height: 240 mm) having an effective volume of about 2 L to obtain an aqueous silica hydrogel slurry. The retention time was 1.4 hours. The obtained aqueous slurry was aged and filtered, and the filter cake was washed with water and dried in the same manner as in Example 1 to obtain porous silica spheres. The yield of the obtained porous silica spheres was 19.5 g. The isononane phase after separation was supplied to the nozzle 6 and recycled for the emulsification operation.

It was confirmed by scanning electron microphotography that the obtained porous silica spheres were almost completely spherical. The arithmetical mean particle size was 51 μm with a standard deviation of 6.8 μm. The value obtained by dividing the standard deviation in the particle size distribution by the arithmetical mean particle size was 0.133, which indicates that the porous silica spheres had a substantially uniform particle size.

EXAMPLE 3

(1) Assembly of Emulsification Apparatus

A cross-sectional view of an emulsification apparatus is shown in FIG. 4. Two pores having an inner diameter of 3.2 mm were formed on a 50×120 mm rectangular acrylic resin plate 10 having a thickness of 20 μm, and rubber tube pipes (TYGON tube R-3603, manufactured by Norton) having an outer diameter of 3.2 mm were connected to make nozzles 14 and 15 so that a liquid could be supplied through the nozzle 14, and the liquid could be discharged through the nozzle 15. At the center of another 5×120 mm rectangular acrylic resin plate 13 having a thickness of 20 mm, a linear channel with a width of 5 mm and a depth of 2 mm was formed, pores having an inner diameter of 3 mm were opened at both ends, and tetrafluoroethylene tube pipes having an inner diameter of 1 mm were connected to the pores via a joint member to make nozzles 16 and 17 so that a liquid could be supplied through the nozzle 16 and a liquid could be discharged through the nozzle 17. Then, on a 50×120 mm rectangular fluororesin sheet having a thickness of 400 μm, a slit with a width of 3 mm and a length of 70 mm was formed to prepare a fluororesin sheet 11. Further, at the center portion of a 50×100 mm rectangular stainless steel plate 12 having a thickness of 50 μm, 26 pores with a pitch of 100 μm in the width direction and 301 pores with a pitch of 100 μm in the length direction in a parallel arrangement, totally 13,026 pores, each pore having an inner diameter 4r=30 μm and a circular cross-sectional shape, were opened to make micropores Y by an excimer laser. Then, the stainless steel plate 12 was treated with a solution having a solvent-soluble fluororesin (CYTOP, manufactured by Asahi Glass Company, Limited) dissolved in a solvent (CT-solv100, manufactured by Asahi Glass Company, Limited) to form a fluororesin layer in a thickness of 0.1 μm. The open area ratio of the stainless steel plate 12 measured in the same manner as in Example 1 was 7.1%.

The acrylic resin plate 10, the fluororesin sheet 11, the stainless steel plate 12 and the acrylic resin plate 13 were laminated in this order, and top and bottom two sides were clamped with equal forces. On that occasion, the width direction and the length direction of the pores opened on the stainless steel plate 12 were fitted to the width direction and the length direction of the slit formed on the fluororesin sheet 11, respectively, so that the pores were located at the center portion of the slit and the pore of the nozzle 14 and the pore of the nozzle 15 of the acrylic resin plate 10 were located on the slit of the fluororesin sheet 11. Further, the assembled apparatus was checked for leaks by preliminarily supplying water.

(2) Emulsification

The emulsification apparatus assembled in (1) was placed at a right angle to a horizontal plane as shown in FIG. 4. The isononane prepared in the same manner as in Example 1 except that the concentration of the surfactant was 20,000 ppm was supplied from the nozzle 14, and the sodium silicate aqueous solution prepared in the same manner as in Example 1 was supplied from the nozzle 16 to continuously produce a W/O type emulsion. The isononane having a surfactant dissolved therein was supplied at a rate of 900 mL/h. The experiment was carried out at room temperature for 1 hour.

The Reynolds number of the flow of the isononane was about 137 as calculated from a hydraulic radius of the flow path of 176.5 μm, a linear velocity of 0.20 m/s and a viscosity of $7.5 \times 10^{-4}$ Pa·s, and the flow of the isononane was laminar. The supply of the sodium silicate aqueous solution was 29 mL/h, and the linear velocity in the flow direction at the pores was $8.7 \times 10^{-4}$ m/s.

The ratio of the linear velocity of the isononane in the flow direction to the linear velocity of the sodium silicate aqueous solution supplied through the pores in the flow direction at the pore portion was 238.

The W/O type emulsion taken out from the emulsification apparatus was separated into an isononane phase and an emulsion phase utilizing a difference in specific gravity in a separation tank (diameter: 120 mm, height: 300 mm) having an effective volume of about 3 L. The separated isononane phase was supplied to the nozzle 14 and recycled for the emulsification operation. This recycle was repeated four times.

Part of the emulsion phase obtained after each separation operation was sampled, and the average emulsion size (μm) was observed by an optical microscope, and results shown in Table 1 were obtained (in Table 1, n (time) represents the number of time isononane used). Using FT-IR, the concentration of the surfactant was quantitatively analyzed from carbonyl absorption intensity, and no change in concentration was confirmed among the respective samples.

TABLE 1

| n | Emulsion size |
|---|---|
| 1 | 55 |
| 2 | 100 |
| 3 | 120 |
| 4 | 120 |
| 5 | 110 |
| 6 | 120 |

It is judged from the results shown in Table 1 that although the surfactant ability of the organic liquid initially decreases by the contact with the aqueous liquid, it is relatively stable after the third use of the isononane.

EXAMPLES 4 to 10

10 L of isononane was prepared in the same manner as in Example 1 except that the concentration of the surfactant was 20,000 ppm, and 1.2 L thereof was put in a 2 L beaker, and a liquid containing an alkali as identified in Table 2 was added, followed by mixing for 10 minutes with a stirrer. A W/O type emulsion was prepared in the same manner as in Example 3 except that the above liquid was left to stand overnight and then about 1 L of the isononane phase as an upper phase was collected and used as an organic liquid. Part of the obtained emulsion was sampled, and it was observed by an optical microscope whether an emulsion was formed or not. Further, a change in the emulsion size after left to stand overnight was observed by an optical microscope, to examine stability of the emulsion. The results are shown in Table 2.

TABLE 2

| | Treatment method | | | | | |
|---|---|---|---|---|---|---|
| | NaOH aqueous solution concentration (N) | Sodium silicate aqueous solution | Addition amount *2) | Amount of sodium added per solvent (g/L) | Emulsion formation ability | Emulsion stability |
| Ex. 4 | 5 | — | 3.5 | 0.40 | X | — |
| Ex. 5 | 1 | — | 3.5 | 0.081 | ○ | X |
| Ex. 6 | 0.5 | — | 0.14 | 0.002 | ○ | ○ |
| Ex. 7 | 0.5 | — | 0.7 | 0.008 | ○ | ○ |
| Ex. 8 | 0.5 | — | 3.5 | 0.040 | ○ | ○ |
| Ex. 9 | 0.05 | — | 70 | 0.081 | ○ | ○ |
| Ex. 10 | — | *1) | 0.5 | 0.040 | ○ | ○ |

*1) Prepared in the same manner as in Example 1
*2) Addition amount (mL) per liter of the organic liquid It is found from the results shown in Table 2 that the surfactant ability of the organic liquid remarkably decreases by the contact with a strongly alkaline aqueous solution.

EXAMPLE 11

An emulsification apparatus was assembled in the same manner as in Example 3 except that one having a thickness of 200 μm was used for the fluororesin sheet 2, and the inner diameter of the pores opened on the stainless steel plate 3 was 20 μm. Using the assembled emulsification apparatus, a W/O type emulsion was prepared in the same manner as in Example 10. The amount of isononane used was 950 mL/time. The loss of isononane and the like in one emulsification operation was roughly estimated at 100 mL/n, and the recycle was repeatedly carried out while the organic liquid prepared in the same manner as in Example 10 was added in an amount of 100 mL/time to the isononane phase obtained after each separation operation to continuously prepare a W/O type emulsion.

To the separated emulsion, isononane containing 7,000 ppm of a surfactant was added so that the total amount would be 900 mL, and carbon dioxide gas was blown for 30 minutes at a rate of 200 mL/min to solidify droplets. The resulting solid was separated, washed and dried to obtain porous silica spheres. The particle size distribution of the obtained porous silica spheres was measured by means of an electrical sensing zone method (Multisizer 3, manufactured by Beckman Coulter, Inc.) using an aperture of 140 μm. The results are shown in Table 3.

TABLE 3

| n | average particle size (um) | $D_{25}/D_{75}$ |
|---|---|---|
| 1 | 47.7 | 1.15 |
| 6 | 47.1 | 1.14 |
| 11 | 49.0 | 1.17 |
| 17 | 48.4 | 1.16 |
| 24 | 49.6 | 1.16 |
| 49 | 52.4 | 1.18 |
| 55 | 56.3 | 1.18 |
| 60 | 55.1 | 1.26 |
| 66 | 51.2 | 1.22 |
| 85 | 57.2 | 1.23 |
| After carbon dioxide treatment | 48.3 | 1.16 |

It is found from the results shown in Table 3 that both average particle size and particle size distribution width gradually increase with time by repeated use of isononane.

Then, into the organic liquid (about 800 mL) used 85 times, carbon dioxide gas was blown for 30 minutes at a rate of 200 mL/min, and then the air was blown for 15 minutes at a rate of 200 mL/min to carry out decarboxylation treatment, and the isononane solution prepared in the same manner as in Example 10 was added thereto so that the total amount would be 950 mL, and the resulting liquid was used again as the organic liquid to prepare a W/O type emulsion, which was subjected to solidification treatment in the same manner as mentioned above to obtain porous silica spheres. The average particle size and the particle size distribution of the porous silica spheres measured in the same manner as mentioned above are shown in Table 3.

It is found from the results shown in Table 3 that the surfactant ability of the organic liquid recovers by acid treatment (carbon dioxide gas treatment).

INDUSTRIAL APPLICABILITY

According to the present invention, inorganic spheres having a substantially uniform particle size can be produced with high productivity by a stable continuous process.

The entire disclosure of Japanese Patent Application No. 2003-133992 filed on May 13, 2003 including specification, claims, drawings and summary is incorporated herein by reference in its entirety.

What is claimed is:
1. A process for producing inorganic spheres, comprising:
preparing an emulsion by injecting
an alkaline aqueous liquid containing an inorganic compound into
a laminar flow of an organic liquid containing a surfactant and running at
a flow rate of from 0.001 to 2 m/s
in a flow path compartmentalized by at least one diaphragm through micropores penetrating through one diaphragm in its thickness direction to form a W/O emulsion containing droplets of the aqueous liquid containing said inorganic compound;
separating an organic liquid (A) from the W/O emulsion containing droplets of the aqueous liquid containing said inorganic compound:
solidifying said droplets of the aqueous liquid containing said inorganic compound in said W/O emulsion by using an acid to form a liquid containing said inorganic spheres;
separating said liquid containing said inorganic spheres into an organic liquid (A') and said inorganic spheres, and
deacidifying the organic liquid (A') and recycling the organic liquid (A') to said laminar flow of said organic liquid in said flow path;
contacting said organic liquid (A) with an acid,
deacidifying said organic liquid (A); and
recycling the organic liquid (A) to said laminar flow of said organic liquid in said flow path.

2. The process for producing inorganic spheres according to claim 1, wherein the inorganic compound is at least one member selected from the group consisting of potassium silicate, sodium silicate, sodium aluminate and silica.

3. The process for producing inorganic spheres according to claim 1, wherein the surfactant is a nonionic surfactant.

4. The process for producing inorganic spheres according to claim 1, wherein the surfactant is contained in the organic liquid in an amount of from 500 to 50,000 ppm.

5. The process for producing inorganic spheres according to claim 1, wherein at least part of the diaphragms constituting the flow path for the organic liquid is made of a transparent material.

6. The process for producing inorganic spheres according to claim 5, wherein the preparing of the W/O emulsion is carried out while being continuously monitored by means of a monitor provided via said transparent material.

7. The process for producing inorganic spheres according to claim 1, wherein the organic liquid supplied to the flow path is one which has been brought into contact with the alkaline aqueous liquid and separated and recovered.

8. The process for producing inorganic spheres according to claim 1, comprising: separating said liquid containing said inorganic spheres into an organic liquid (A') and said inorganic spheres.

9. The process for producing inorganic spheres according to claim 8, wherein the inorganic compound is sodium silicate; and
wherein a proportion of silicic acid to sodium in said sodium silicate is from 2.0 to 3.8 in terms of a $SiO_2/Na_2O$ molar ratio.

10. The process for producing inorganic spheres according to claim 1, wherein a concentration of alkali silicate or silica as inorganic compound in the aqueous liquid is preferably from 5 to 30 mass % in terms of the $SiO_2$ concentration.

11. The process for producing inorganic spheres according to claim 1, wherein said organic liquid is a $C_{9-12}$ saturated hydrocarbon.

12. The process for producing inorganic spheres according to claim 1, wherein said $C_{9-12}$ saturated hydrocarbon has a flash point of from 20 to 80° C.

13. The process for producing inorganic spheres according to claim 1, wherein said surfactant is selected from the group consisting of a polyethylene glycol fatty acid ester, a polyethylene glycol alkyl ether, a sorbitan fatty acid ester, a polyoxyethylene sorbitan fatty acid ester, a polyoxyethylene alkyl phenyl ether and a polyoxyethylene alkyl ether.

14. The process for producing inorganic spheres according to claim 1, wherein a Reynolds number of the flow said organic liquid in the flow path is at most 2,100.

15. The process for producing inorganic spheres according to claim 1, wherein said organic liquid (A') is separated from the W/O emulsion before solidification of the droplets.

16. The process for producing inorganic spheres according to claim 1, wherein said acid for contacting said organic liquid (A') is carbon dioxide gas or a solid acidic substance.

17. The process for producing inorganic spheres according to claim 1, wherein said acid for contacting said organic liquid (A') is a cation exchange resin.

18. The process for producing inorganic spheres according to claim 1, wherein said acid for contacting said organic liquid (A') is sulfuric acid, hydrochloric acid, or nitric acid.

19. The process for producing inorganic spheres according to claim 1, wherein said acid for contacting said organic liquid (A') is carbon dioxide gas.

* * * * *